Oct. 23, 1962     T. A. JAMIESON     3,059,312
COMPOSITE LAMINATED STRUCTURES OF HIGH PERMEABILITY
Filed Dec. 14, 1959
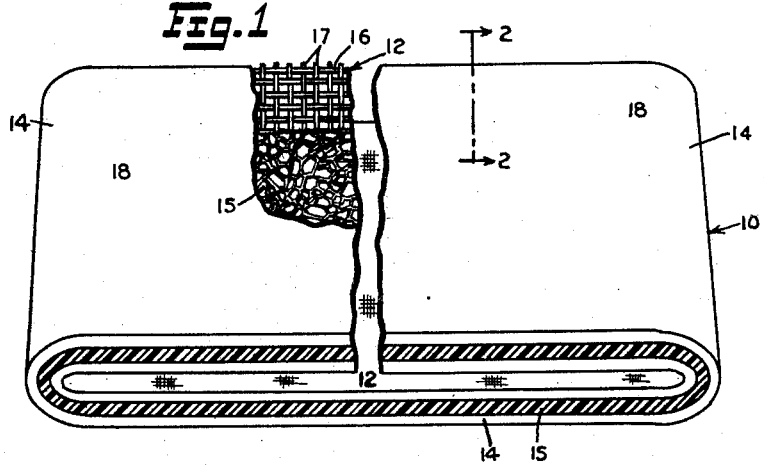
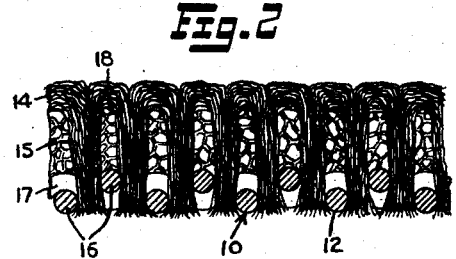
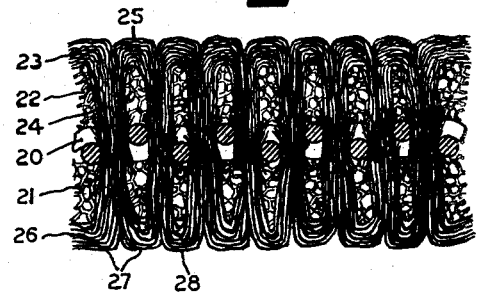
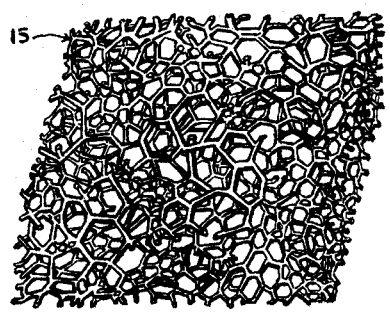
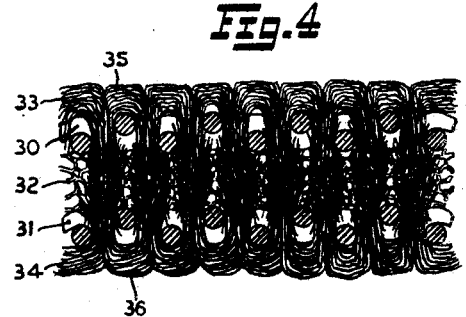
INVENTOR.
THOMAS A. JAMIESON
BY
W Russell Greenwood
ATTORNEY United States Patent Office 3,059,312
Patented Oct. 23, 1962

3,059,312
COMPOSITE LAMINATED STRUCTURES OF
HIGH PERMEABILITY
Thomas A. Jamieson, Glocester, R.I., assignor to Draper Brothers Company, Canton, Mass., a corporation of Massachusetts
Filed Dec. 14, 1959, Ser. No. 859,508
9 Claims. (Cl. 28—79)

The present invention relates in general to porous filtration media and, in particular, to such articles made as non-rigid composite porous laminated structures which are highly permeable throughout to readily allow the passage of gases and liquids through them. More specifically, it is concerned with a flexible porous laminated structure which is especially adapted for use in the production of industrial and papermakers' felts that depend for their usefulness on their ability to permit uniform and controlled drainage through the interstices or pores thereof of liquid from the paper sheet as it is formed on and transported by the upper surface of such felts.

The invention has as its principal object the production of a composite porous laminated or sandwich product having a predominantly open-cell structure, excellent flexibility, and high permeability to the passage of gases and liquids, and which may be used not only for various filtration purposes but also for the manufacture of industrial and papermakers' wet felts for liquid drainage purposes in papermaking machines.

Another object of the invention is to provide an industrial or papermakers' felt structure having novel and improved characteristics.

Further objects and advantages of the present invention and the novel features thereof will be more readily understood from the following description taken in conjunction with the accompanying drawings in which certain ways of carrying out the invention are shown for illustrative purposes:

FIG. 1 is a pictorial plan view illustrating a papermakers' felt in the form of an endless belt made in accordance with the present invention, a portion of the upper face of the belt being broken away to show the various layers of its composite porous laminated structure;

FIG. 2 is a fragmentary cross-sectional view, on greatly enlarged scale, taken along the line 2—2 in FIG. 1;

FIG. 3 is an enlarged cross-sectional view corresponding to FIG. 2, but showing a modified form of composite porous laminated structure according to the invention;

FIG. 4 is an enlarged cross-sectional view corresponding to FIG. 2 but showing a second modified form of composite porous laminated structure according to the invention; and FIG. 5 is a greatly enlarged plan view of a fragmentary portion of a sheet of synthetic resin foam representative of the type which I employ and showing its open-cell skeletal structure.

Referring now to the drawings in detail, and in particular to FIGS. 1 and 2 thereof, the composite porous laminated structure therein illustrated and made in accordance with the present invention is in the form of an endless papermakers' felt or belt which is herein generally designated by the reference numeral 10 and comprises two outer spaced generally sheet-like facing layers 12 and 14 of textile fabric material which respectively form the bottom and top surfaces of the felt, and an intermediate layer 15 of high porosity which is coextensive with and confined between the layers 12 and 14. The layer 15 consists of a slab-like body or sheet of a flexible synthetic resin foam material having a predominantly open-cell structure throughout and capable of effecting high liquid transmission or drainage therethrough. The relative thickness of the various layers may be varied as the requirements of the felt indicate.

The synthetic resin foam herein employed preferably is a flexible polyurethane foam based on the reaction between polyfunctional isocyanates, usually tolylene diisocyanates with hydroxyl-rich compounds, such as polyethers or polyesters. In practice, I have found the skeletal-structure, open-cell, polyurethane resin foam basic material as described in U.S. Patent No. 2,900,789 and which is produced commercially and marketed under the trade name of Scottfoam, a product of Scott Paper Company, Foam Division, Chester, Pennsylvania, to be a satisfactory material for the intermediate layer 15.

In FIG. 2 the various layers 12, 14 and 15 of the FIG. 1 embodiment of the invention are illustrated in cross-section wherein the under surface or inside facing layer 12 of the felt consists of a woven fabric having a relatively open mesh and made up of warp threads 16 and filling threads 17, these warp and filling threads being composed of natural or synthetic fibers. The fabric material of the layer 12 may be either woven endless or woven in open-ended form and subsequently made endless by a joining process. The upper surface or outside facing layer 14 of the felt is composed of an unwoven fabric, preferably of fibrous material 18 in the form of one or more batts or fine pile fleeces which are superimposed on one another and upon the top surface of the resin foam layer 15, the layers all being integrally held together by needling the fibers of the batts or fleeces through the center resin foam layer 15 and into and through the woven fabric under layer 12.

The needling process consists in forcing the fibers of the batts or fleeces into and through the resin foam layer 15 and into and through the woven fabric layer 12 thus leaving parts of the fibrous material 18 upon the upper surface of the felt to form a close structure cushioning paper formation surface while the needled-in fibers of the fibrous material 18 extend from the top surface of the felt to its bottom surface and are engaged in and interlocked with the fibers of the woven bottom fabric layer 12. The needling of the batts or fleeces of the unwoven upper fabric layer 14 to the woven under fabric layer 12 may be carried out by known needling methods and machines, such as are disclosed in the prior U.S. Patents No. 1,620,307, dated March 8, 1929; No. 1,743,-068, dated January 7, 1930; No. 1,745,739, dated February 14, 1930; No. 1,853,961, dated April 12, 1932; and Reissue Patent No. 21,890, dated August 26, 1941.

The fibrous material 18 of such added batts or pile fleeces which form the upper surface or outer facing layer 14 of the felt may consist entirely of one kind of fibrous material, such as wool or other natural fibers, or of synthetic fibers, or it may consist of blends in any desired percentages of natural and synthetic fibers.

In FIG. 3 there is illustrated in cross-section a modified form of papermakers' felt with the center layer 20 being a woven fabric with two layers of synthetic resin foam 21 and 22 respectively at opposite sides thereof, a top finishing layer 23 of needled fine wool fibers 24 to give a smooth close structure pulp-receiving surface 25, and a bottom layer 26 of needled coarse wool fibers 27 to give an open structure wear-resistant surface 28 on the bottom or inside of the felt for contacting the rollers of the papermaking machine.

In FIG. 4 there is illustrated in cross-section a second modified form of laminated papermakers' felt structure in which two woven base fabric layers 30 and 31 confine between them a center layer 32 of synthetic resin foam having a predominantly open-cell structure. A top finishing layer 33 of fine wool in batt or fleece form and a bottom layer 34 of coarse wool in batt or fleece form are needled into and through the two base fabric layers 30 and 31 and through the resin foam layer 32 to give a smooth close structure pulp-receiving surface 35 on the top and a strong open structure wear-resistant surface 36 on the bottom or inside of the felt for contacting the rolls of the papermaking machine.

The resilient predominantly open-cell skeletal structure characterizing the synthetic resin foam material which I employ in the various embodiments of the present invention herein disclosed and described provides a considerable number of open fluid flow passages communicating with one another between the top and bottom surfaces of the various composite porous laminated structures herein illustrated. This is particularly desirable because it prevents the pore system of these laminated filtration structures from becoming clogged, which is important to papermakers since it is essential that the felt structures that they employ remain very porous over a considerable period of use and free from becoming clogged by particles from the wet paper stock, clay, fibers, etc., which would prevent easy passage or drainage of water through the felts from the top to the bottom surfaces thereof.

From the foregoing description, it will be seen that I have provided an improved flexible composite porous laminated filtration structure of high permeability especially adapted for use in the manufacture of industrial and papermakers' felts and in which, in the latter instance, its main advantage resides in being produced with a fine close top surface which presents a fine finish to the paper sheet being formed thereon and having an extremely open porous structure in the under layers of the felt which is capable of giving a high rate of water removal from the wet paper pulp deposited upon and supported by the top surface of the felt during formation of the paper sheet thereon in the papermaking machine. The aforesaid upper layer of my felt has very good resilience or cushioning characteristics which are maintained over a long period and are greatly improved over conventional felt construction because of the springy properties of the under layer or layers of synthetic resin foam.

Furthermore, there is no liquid retention by the resin foam which I employ since its pore system or cell structure is open throughout its depth to the passage of liquids from the top surface to the bottom surface thereof.

The rapid recovery of the resin foam layer to its original thickness after compression by passage of the felt between the paper machine rolls results in a sponge-like action which produces a suction to draw or effect rapid water removal from the paper sheet carried on the upper surface of the felt.

An additional advantage of the composite porous laminated structure of my invention is the excellent wicking action which ocurs because of the "capillary size" channels which are due to the combination of the needled fibers extending from the top surface to the bottom surface of the felt and of the controlled pore size (i.e. the number of pores per inch) open-cell structure of the resin foam.

Also, in the foregoing description, where the term "papermaking machine" has been used, it is meant to include this type of machine when running on other types of materials, such as boxboard, leatherboard, asbestos cement products, roofing paper, etc.

It should be understood that the foregoing detailed description and disclosed forms of the invention are made merely for the purpose of illustration and that the invention includes all modifications, variations, and equivalents which fall within the scope of the appended claims.

What is claimed is:

1. A flexible composite porous laminated structure for use for filtration purposes characterized by its high degree of permeability to passage of fluids therethrough comprising two spaced outer layers each of a textile fabric, and an intermediate layer of synthetic resin foam confined between said fabric layers, said fabric layers and said foam layer being coextensive with one another and integrally united together solely by depth penetration of considerable of the fibers of at least one of said outer fabric layers inwardly of such laminated structure into and through both the intermediate resin foam layer and the other fabric layer wherein they are entangled with the fibers of the latter layer and interlocked therewith, said resin foam layer having a completely open-cell structure throughout.

2. A composite porous laminated structure as claimed in claim 1 in which said synthetic resin foam is a flexible polyurethane resin foam.

3. A papermakers' felt having a highly permeable flexible composite porous laminated structure comprising two outer layers of textile fabric, and intermediate layer of synthetic resin foam confined between said fabric layers, said fabric layers being coextensive with one another and integrally united together solely by depth penetration of considerable of the fibers of at least one of said outer fabric layers inwardly of such laminated structure into and through both the intermediate resin foam layer and the other fabric layer wherein they are entangled with the fibers of the latter layer and interlocked therewith, said resin foam layer having a completely open-cell skeletal structure throughout effective to provide easy passage of liquid therethrough.

4. A papermakers' felt as claimed in claim 3 in which said synthetic resin foam is a flexible polyurethane resin foam.

5. A papermakers' felt of composite laminated structure for use in papermaking machinery for supporting and draining wet papermaking fibre material comprising two spaced fabric layers, and an intermediate layer of a synthetic resin foam coextensive with and confined between said fabric layers, said resin foam layer having a completely open-cell skeletal structure throughout effective for easy passage of liquid therethrough, one of said fabric layers of said felt comprising a smooth close structure of needled fleece for receiving and carrying pulp material, and the other of said fabric layers being of a woven construction with an open weave to provide drainage passages therethrough, said fabric layers and said resin foam layer all being integrally held together by the needled fibers of the fleece extending through the center resin foam layer into and through the woven fabric layer and interlocked with the fibers thereof.

6. A papermakers' felt in the form of an endless belt of composite laminated structure for use in papermaking machinery for supporting and draining wet papermaking fibre material comprising two spaced layers each of a woven fabric having an open weave to provide drainage passages therethrough, and an intermediate layer of a synthetic resin foam confined between said fabric layers in which the latter form respectively the top and bottom surfaces of the felt, said fabric layers and said foam layer being coextensive with one another integrally united together, said resin foam layer having a completely open-cell skeletal structure throughout, the top fabric surface layer of said felt comprising a smooth close structure surface of needled fleece for receiving and carrying pulp material and the bottom fabric surface or layer of said felt comprising a needled fleece of coarser fibers having an open structure surface effective for permitting liquid drainage from the pulp material therethrough and from the other superposed layers of the felt without clogging, said coarse needled bottom fleece layer of the felt constituting a wear-resisting driving surface for the felt when installed in operative relation and in contact with the rolls therefor of the papermaking machine.

7. A papermakers' felt of composite laminated structure for use in papermaking machinery for supporting and draining wet papermaking fibre material comprising two spaced outer fabric facing layers, a center layer of woven fabric with an open weave to provide drainage passages therethrough, synthetic resin foam layers coextensive with and disposed at opposite sides of said center woven fabric layer and confined between the latter and the respective outer fabric layer adjacent thereto, said resin foam layers each having a completely open-cell skeletal structure throughout effective for easy passage of liquids therethrough, one of said outer fabric facing layers of said felt comprising a smooth close structure needled fleece for receiving and carrying pulp material, and the other of said outer fabric facing layers of said felt comprising a needled fleece of coarser fibers having an open structure surface effective for permitting liquid drainage from the pulp material therethrough and from the other superposed layers of the felt without clogging, said fabric layers and said foam layers all being integrally held together by the needled fibers of the respective fleeces through the respective resin foam layers into and through the center woven fabric layer and interlocked with the fibers thereof.

8. A composite porous laminated article of manufacture for use for filtration purposes characterized by its high degree of permeability to passage of fluids therethrough comprising two opposed spaced layers each of a textile structure, and an intermediate layer of a synthetic resin foam confined between said textile layers, said textile layers and said foam layer being coextensive with one another and united together solely by depth penetration of considerable of the fibers of at least one of said opposed textile layers inwardly of the depth of the article into and through both the intermediate resin foam layer and the other fabric layer wherein they are entangled with the fibers of the latter layer and interlocked therewith, said resin foam layer having a completely open-cell skeletal structure.

9. A papermakers' felt as claimed in claim 7 in which the synthetic resin foam layer recited in said claim consists of a completely open-cell cellular mass of foamed flexible polyurethane resin.

References Cited in the file of this patent

UNITED STATES PATENTS

| | | |
|---|---|---|
| Re. 21,890 | Walsh et al. | Aug. 26, 1941 |
| 1,651,476 | Sheenan | Dec. 6, 1927 |
| 2,288,426 | Stack | June 30, 1942 |
| 2,293,928 | Beal | Aug. 25, 1942 |
| 2,429,486 | Reinhardt | Oct. 21, 1947 |
| 2,900,278 | Powers et al. | Aug. 18, 1959 |
| 2,951,278 | Hoffman | Sept. 6, 1960 |
| 2,970,365 | Morgenstern | Feb. 7, 1961 |

FOREIGN PATENTS

| | | |
|---|---|---|
| 754,834 | Great Britain | Aug. 15, 1956 |
| 789,481 | Great Britain | Jan. 22, 1958 |